United States Patent
Dyer et al.

(10) Patent No.: US 10,535,271 B1
(45) Date of Patent: Jan. 14, 2020

(54) SMART SIGNS FOR AUTONOMOUS VEHICLES

(71) Applicant: Waymo LLC, Mountain View, CA (US)

(72) Inventors: John Wesley Dyer, Mountain View, CA (US); Philip Nemec, San Jose, CA (US); Joshua Newby, San Francisco, CA (US); Michael Epstein, Danville, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/156,369

(22) Filed: Oct. 10, 2018

(51) Int. Cl.
| | |
|---|---|
| *G08G 1/00* | (2006.01) |
| *H04L 29/08* | (2006.01) |
| *G06Q 50/30* | (2012.01) |
| *H04W 12/06* | (2009.01) |
| *G05D 1/00* | (2006.01) |
| *H04L 29/06* | (2006.01) |

(52) U.S. Cl.
CPC ........... *G08G 1/202* (2013.01); *G05D 1/0088* (2013.01); *G06Q 50/30* (2013.01); *H04L 67/12* (2013.01); *H04L 67/18* (2013.01); *H04W 12/06* (2013.01); *H04L 67/42* (2013.01)

(58) Field of Classification Search
CPC ...... G08G 1/202; G05D 1/0088; G06Q 50/30; H04L 67/12; H04L 67/18; H04L 67/42; H04W 12/06
USPC .......................................................... 340/989
See application file for complete search history.

(56) References Cited

U.S. PATENT DOCUMENTS

| | | | | |
|---|---|---|---|---|
| 9,599,477 | B1 * | 3/2017 | Aula | E05F 15/70 |
| 9,836,057 | B2 * | 12/2017 | Fairfield | H04W 4/029 |
| 9,875,589 | B1 | 1/2018 | Buttolo et al. | |
| 10,290,074 | B2 * | 5/2019 | Sweeney | G06Q 50/30 |
| 10,401,858 | B2 * | 9/2019 | Pandit | |
| 2015/0339928 | A1 * | 11/2015 | Ramanujam | G08G 1/202 701/23 |
| 2016/0370194 | A1 * | 12/2016 | Colijn | G01C 21/343 |
| 2017/0075358 | A1 * | 3/2017 | Zhang | G06Q 10/06 |
| 2017/0213308 | A1 * | 7/2017 | Wellborn | B60R 25/24 |
| 2017/0344010 | A1 | 11/2017 | Rander et al. | |
| 2017/0370734 | A1 | 12/2017 | Colijn et al. | |
| 2018/0342035 | A1 * | 11/2018 | Sweeney | G06Q 50/30 |
| 2019/0065852 | A1 * | 2/2019 | Badalamenti | G06K 9/00671 |

FOREIGN PATENT DOCUMENTS

WO 2017180382 A1 10/2017

* cited by examiner

*Primary Examiner* — Nay Tun
(74) *Attorney, Agent, or Firm* — Botos Churchill IP Law

(57) ABSTRACT

The disclosure relates to smart signs or physical markers for facilitating passenger trips for autonomous vehicles. For instance, a physical marker remote from the autonomous vehicles may receive a first notification indicating a request for a trip has been made via a client computing device. The physical marker may determine when the client computing device has reached a physical marker, and in response to the determination, the physical marker may send a second notification to a dispatching server computing device indicating that the client computing device has reached a physical marker. Other aspects of the disclosure relate to various features and uses for the physical marker.

20 Claims, 8 Drawing Sheets

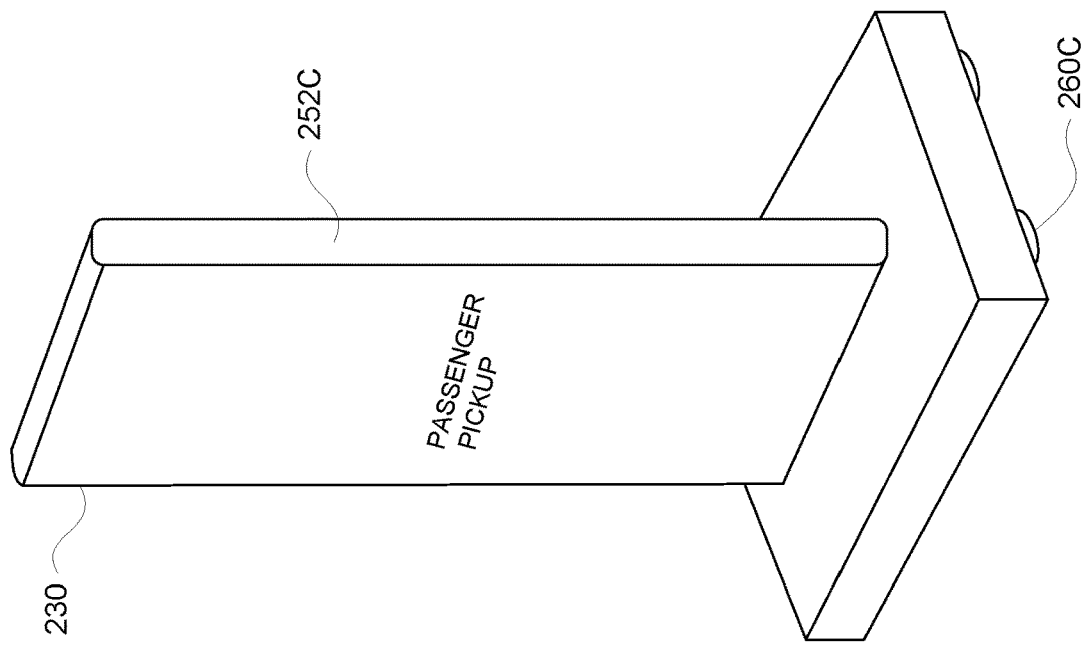
FIGURE 2C
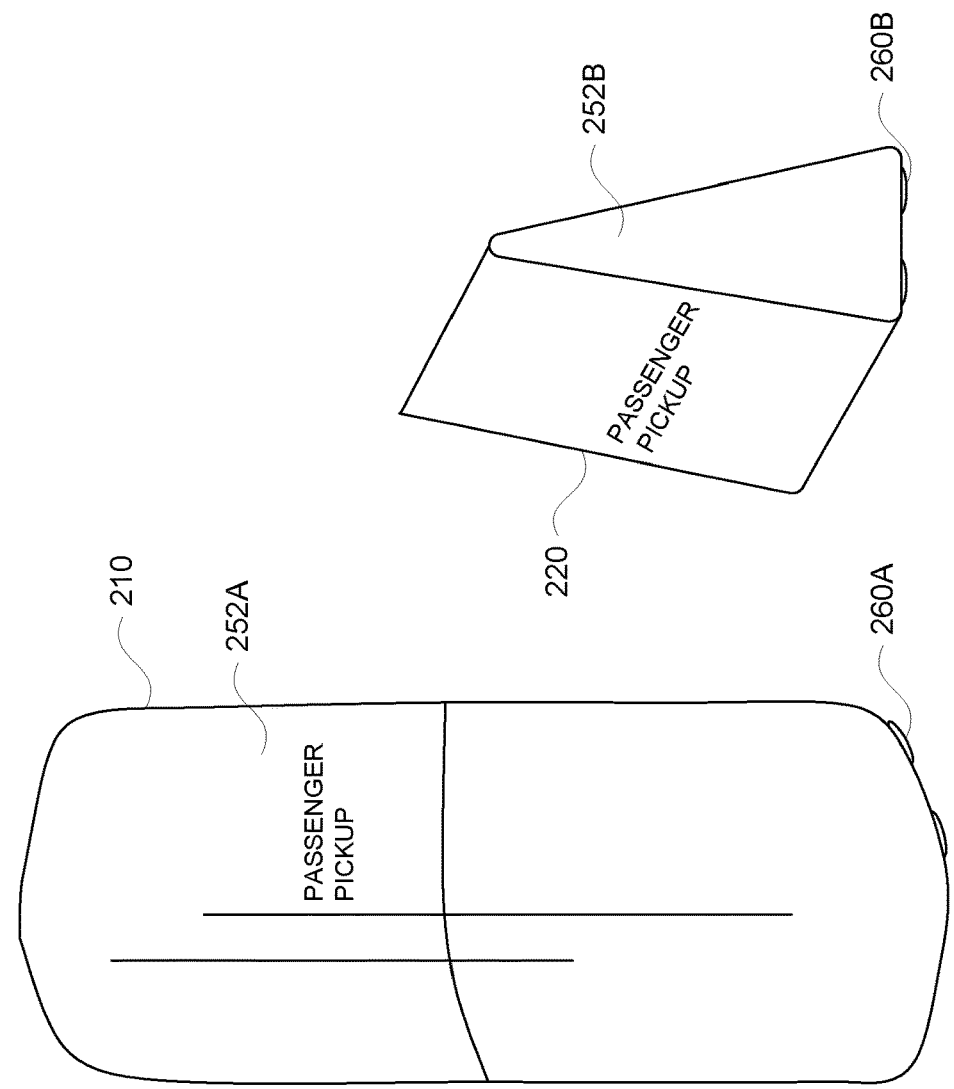
FIGURE 2B
FIGURE 2A

SMART SIGNS FOR AUTONOMOUS VEHICLES

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

When a person (or user) wants to be physically transported between two locations via a vehicle, they may use any number of taxi services. To date, these services typically involve a human driver who is given dispatch instructions to a location to pick up and drop off the user. Generally these locations are worked out via physical signals (i.e. flagging down the driver), a phone call where the user explains where he or she actually is, or an in person discussion between the driver and user. In the case of an autonomous vehicle, such coordination is often difficult or impossible to achieve and may lead to significant inconvenience to the passenger in terms of the distance to reach a vehicle or desired destination where the vehicle stops to pick up or drop off a passenger, respectively.

BRIEF SUMMARY

One aspect of the disclosure provides a method of facilitating passenger trips for autonomous vehicles. The method includes receiving, by one or more processors of a physical marker remote from the autonomous vehicles, a first notification indicating a request for a trip has been made via a client computing device; determining, by the one or more processors, when the client computing device has reached the physical marker; and in response to the determination, sending, by the one or more processors, a second notification to a dispatching server computing device indicating that the client computing device has reached the physical marker.

In one example, determining when the client computing device has reached the physical marker includes determining that the client computing device has physically contacted the physical marker. In another example, determining when the client computing device has reached the physical marker includes determining that the client computing device is within a predetermined distance of the physical marker. In another example, the first notification includes information for authenticating the client computing device, and wherein determining when the client computing device has reached the physical marker includes authenticating the client computing device using the information and the second notification is sent after the authenticating. In another example, the method also includes sending one or more notifications to an assigned vehicle for the passenger, the one or more notifications indicating a location of the passenger relative to the physical marker. In this example, the method also includes determining the location of the passenger relative to the physical marker via signals from the client computing device. In another example, the method also includes determining a number of pedestrians proximate to the physical marker using one or more sensors and sending the number of pedestrians to the dispatching server computing device. In another example, the method also includes sending data generated by one or more sensors of the physical marker to an autonomous vehicle assigned to a user of the client computing device. In another example, the method also includes monitoring, using sensors of the physical marker, status of a stopping area adjacent to the physical marker and sending the status to an autonomous vehicle assigned to a user of the client computing device. In this example, the status indicates that the stopping area is available for the autonomous vehicle. In another example, the method also includes determining a status of a stopping area adjacent to the physical marker and providing one or both of a visual or an audible notification at the physical marker indicating the status. In this example, the status includes an autonomous vehicle approaching the stopping area. In this example, the method also includes receiving information indicating a location of an autonomous vehicle assigned to a user of the client computing device and providing one or both of a visual or an audible notification at the physical marker indicating a status of the autonomous vehicle based on the received information. In another example, the method also includes determining that a passenger should wait at a second physical marker and sending a notification to the client computing device based on the determination that a passenger is able to wait at a second physical marker. In this example, the notification includes a request for confirmation that the passenger wishes to go to the second physical marker. In addition, the notification includes walking instructions for reaching the second physical marker from the physical marker.

Another aspect of the disclosure provides a method of assigning autonomous vehicles for passenger trips. The method includes receiving, by one or more processors of one or more server computing devices, from a client computing device, a request for an autonomous vehicle, the request identifying a location of the client computing device; selecting, by the one or more processors, one of a plurality of physical markers based on the location, each of the plurality of physical markers being remote from the autonomous vehicles; sending, by the one or more processors, a first notification to the selected physical marker indicative of the received request; sending, by the one or more processors, a second notification to the client computing device identifying the selected physical marker; receiving, by the one or more processors, confirmation from the selected physical marker that the client computing device has reached the selected physical marker; in response to receiving the confirmation, assigning, by the one or more processors, one of the autonomous vehicles to the client computing device; and sending, by the one or more processors, instructions to the one of the autonomous vehicles to dispatch the one of the autonomous vehicles to pick up a passenger associated with the client computing device at a location of the selected physical marker.

In one example, the second notification includes instructions for a passenger to proceed to the location of the selected physical marker. In another example, the method also includes receiving from the selected physical marker, information indicating a number of pedestrians within a predetermined distance of the selected physical marker and using the information indicating the number of pedestrians to distribute one or more of the autonomous vehicles. In another example, the confirmation indicates that the client computing devices has authenticated itself to the physical marker.

BRIEF DESCRIPTION OF THE DRAWINGS

FIGS. 2A-2C are example perspective views of physical markers in accordance with aspects of the disclosure.

DETAILED DESCRIPTION

Overview

Figure 1:
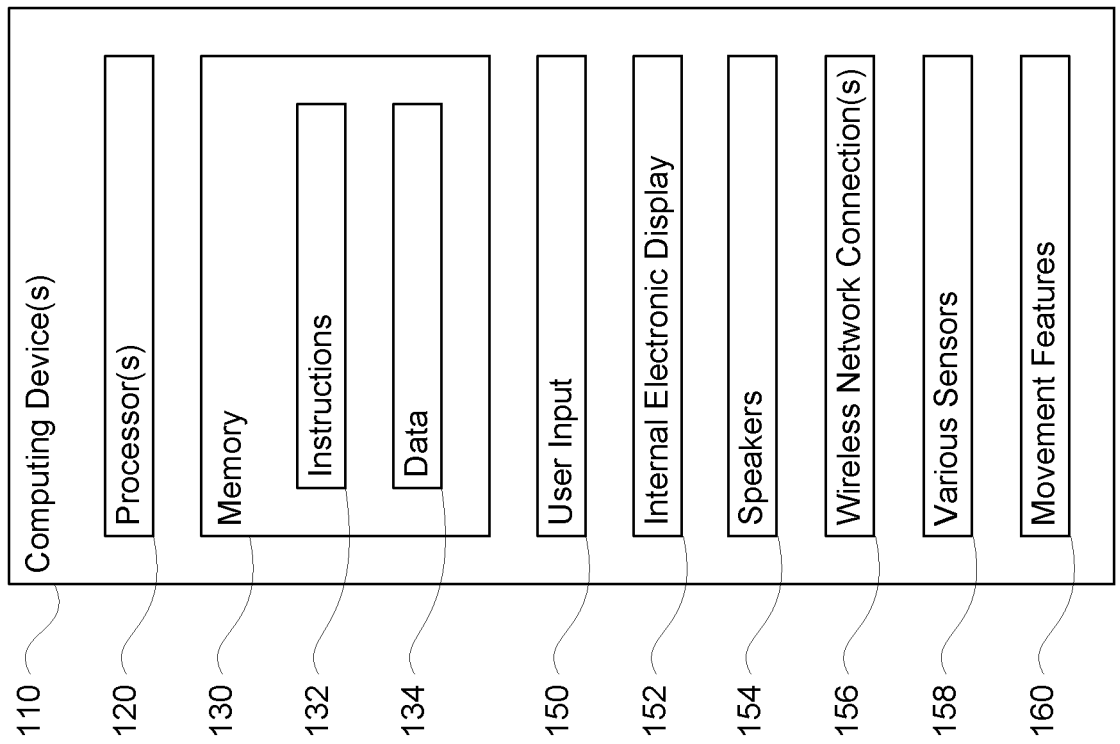
FIG. 1 is a functional diagram of an example physical marker in accordance with an exemplary embodiment.

The technology relates to using a "smart sign" to facilitate passenger pickups and drop off by autonomous vehicles. For instance, a sign or other physical marker may be used to confirm that a passenger is present at a pickup location, to communicate with the vehicle, and also to communicate with users proximate to the physical marker. These physical markers may be especially useful in areas where passengers are likely to require trips, such as at or near shopping malls, entertainment venues, railroad stations, airports, urban areas, etc.

To facilitate all of this, a physical marker may include various computing and sensing devices. For instance, the physical marker may include sensors in order to detect the state of the physical marker and/or it's environment. The physical marker may also include one or more devices for displaying information visually and/or audibly. The physical marker may be movable.

The physical marker may be used to facilitate trip services for autonomous vehicles. For instance, a user (passenger) may use his or her client computing device to request a ride via an application. This request may include the current location of the client computing device and may be sent to a dispatching server computing device. In response, the dispatching server computing device may send a notification to the physical marker. This notification may indicate to the physical marker that a passenger is going to be taking a trip from the location of the physical marker.

The dispatching server computing device may also send a notification to the passenger's client computing device instructing the user to proceed to the physical marker in order to begin the trip. This notification may also include information such as authentication information for authenticating with the physical marker as well as a map, walking direction, etc. identifying the location of the physical marker.

Once the passenger has reached the physical marker, the physical marker may send a notification to the dispatching server computing device indicating the same. Once authenticated, the aforementioned notification may automatically be sent. In response to receiving the notification, the dispatching server computing device may assign a vehicle to the passenger. The assigned vehicle may then proceed to the location of the physical marker in order to pick up the passenger.

The physical marker may also communicate information with the vehicle, either directly or indirectly via the dispatching server computing device, as well as the dispatching server computing device. For instance, the physical marker may provide notifications to the vehicle indicating the location of the passenger relative to the sign. In this regard, the physical marker may also be able to assist an autonomous vehicle with passenger drop offs.

As another instance, the physical marker may use its sensors in various ways. For instance, the physical marker may detect its location or movement and notify the dispatching server computing device if the physical marker has been moved. The physical marker may also use its sensors to determine a number of pedestrians proximate to or approaching the physical marker, and provide this information to the dispatching server computing device. The physical marker may use its various sensors to detect the state of a parking or stopping area adjacent to the physical marker.

The physical marker may also communicate with pedestrians. For instance, the physical marker may display visual and/or provide audible instructions on how to access the application, communicate with the physical marker to request a vehicle assignment, pressing a button on the sign and/or entering a destination via a user input device or audibly, etc. As another instance, when a client computing device which includes the application is proximate to the physical marker, the physical marker may also attempt to communicate with the user of the client computing device. Once a passenger is assigned a vehicle, the physical marker may also provide notifications to indicate that the passenger's vehicle is approaching or about to arrive, for instance by displaying or audibly indicating an estimated time of arrival for the assigned vehicle. The physical marker may also provide warnings to protect pedestrians from inadvertently walking into or near the parking or stopping area, for instance by displaying and/or providing audible information.

The features described herein may allow for better passenger experience in terms of passenger pickups and drop offs, especially in areas with high demand. The physical marker provides a clear way for a passenger to understand where to meet or wait for a vehicle while at the same time providing the ride system (the dispatching server computing devices as well as assigned vehicles) with confirmation of the passenger's location as well as information about the physical marker's environment. The system is also better able to monitor the status of vehicles and waiting passengers without requiring the passenger to take out their mobile computing device (e.g. cellular phone) when the passenger has reached the marker. At the same time, the physical marker is able to better facilitate pickups and provide information to passengers while they are waiting. All of these, may allow passengers to feel safer and more assured. Other potential benefits may include reduced waiting times for vehicles, more efficient loading/unloading as well as better vehicle and vehicle space utilization (i.e. there may be less vehicles parked and waiting for someone that is not there yet).

Example Systems

FIG. 1 is a functional diagram of a physical marker 100 in accordance with one aspect of the disclosure includes various components. FIGS. 2A-2C are example representations 200, 210, 230 of the physical appearance of the physical marker 100. Returning to FIG. 1, the physical marker may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the physical marker includes display device 152 as well as one or more speakers 154 to provide information or audio visual experiences. The one or more display devices may include various types of devices for displaying information visually, such as lights, electronic displays, etc. The physical marker may also include a power source, such as a rechargeable battery and/or solar panels to enable the physical marker to operate for long periods of time.

Computing devices 110 may also include one or more wireless network connections 156 such as transmitters and receivers to facilitate communication with other computing devices, such as the client computing devices and server computing devices described in detail below. The wireless network connections may include short range communication protocols such as near field communication, Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The physical marker may also include various sensors 158. These sensors may include, for instance, such still or video cameras, lidar, radar units, sonar, accelerometer, gyroscope, etc., which may allow the physical marker to detect the state of the physical marker and/or it's environment.

The physical marker may also be movable. In this regard, the physical marker may be light weight, such that a person can pick up and move the physical marker. In some instances, the physical marker may include movement features 160 such as an engine, motor, wheels and/or tracks, which may allow the physical marker to move itself to new locations, for instance, guided by sensor data of the various sensors 158. In addition, the GPS receivers and other location functionality (i.e. software) may allow the physical marker to indicate changes in its location reducing the likelihood of theft or vandalism. FIGS. 2A-2C each provide example representations 210, 220, 230 of the physical marker 100 each including wheels 260A-C corresponding to the movement features 160 and lighted features 252A-C corresponding to the display devices 152 of physical markers 100. In the example of FIG. 2A, lighted feature 252A corresponds to an entire top portion of the example representation 210. In addition, each of example representations 220 and 230 may include a second lighted feature opposite of lighted features 252B and 252C and therefore not shown in FIGS. 2B and 2C.

Figure 3:
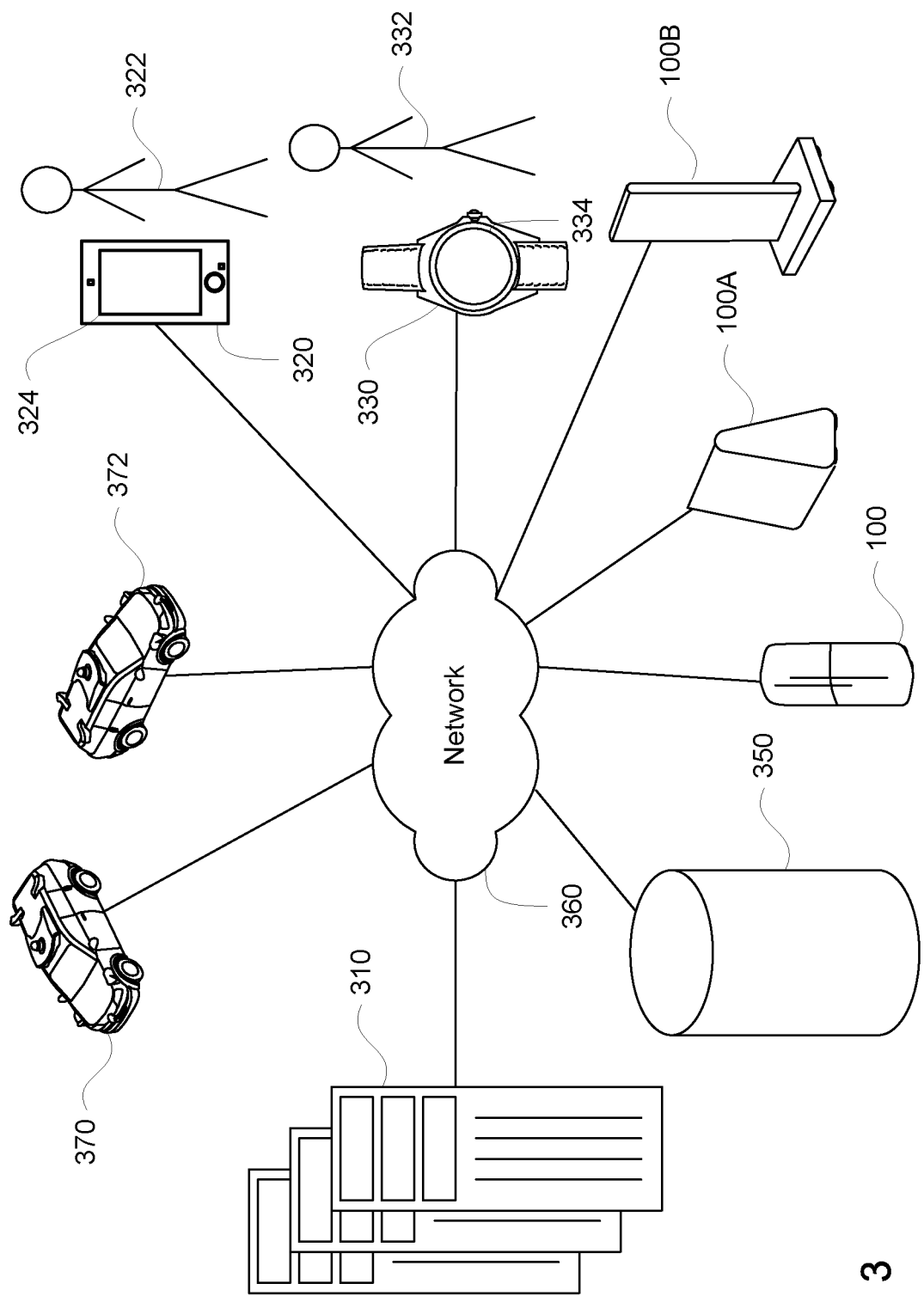
FIG. 3 is a pictorial diagram of an example system in accordance with aspects of the disclosure.
Figure 4:
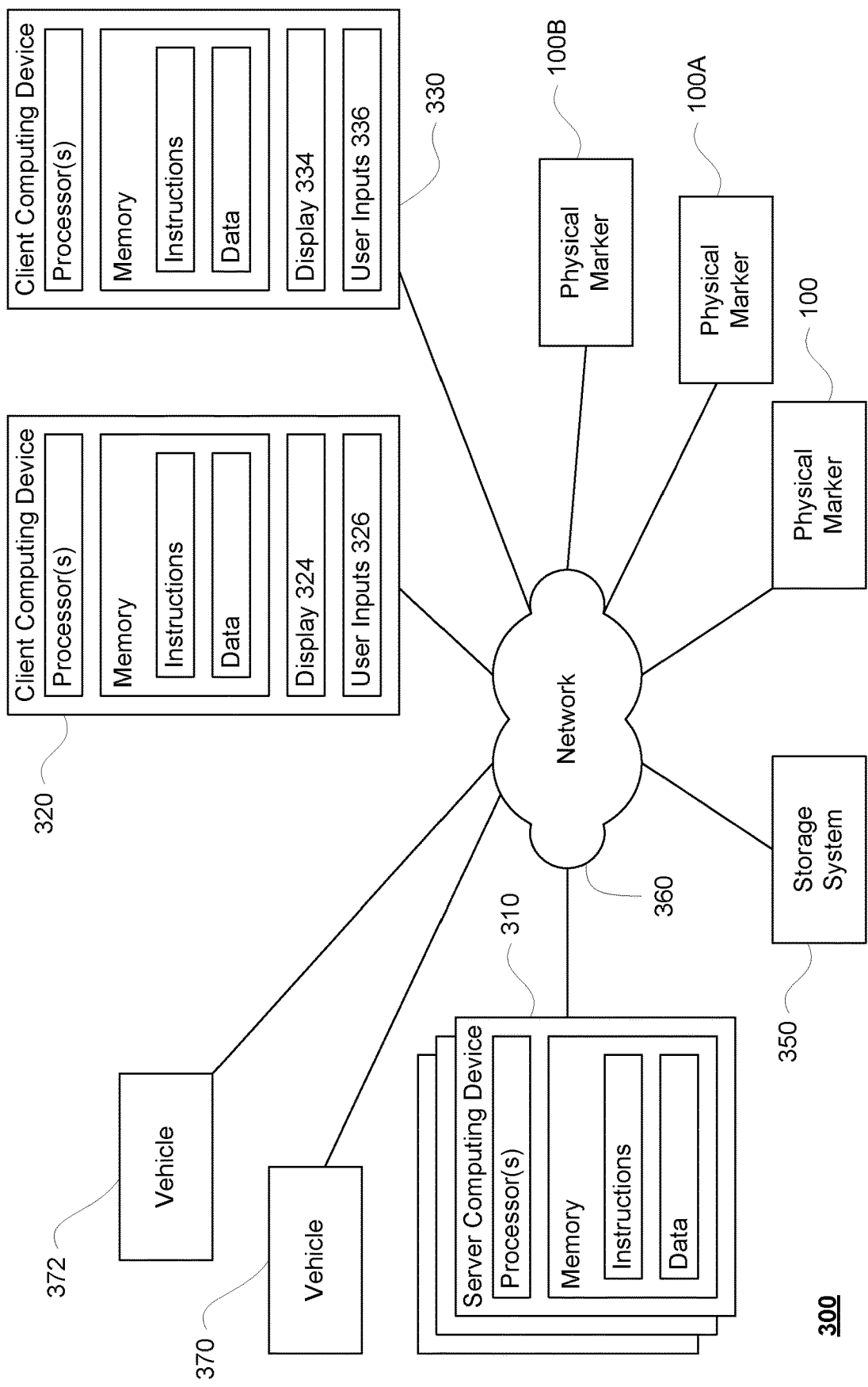
FIG. 4 is a functional diagram of the system of FIG. 3 in accordance with aspects of the disclosure.

Computing device 110 may also receive or transfer information to and from other computing devices, such as those computing devices that are a part of the transportation service as well as other computing devices. FIGS. 3 and 4 are pictorial and functional diagrams, respectively, of an example system 300 that includes a plurality of computing devices 310, 320, 330, and a storage system 350 connected via a network 360. System 300 also includes physical markers 100, 100A, 100B (all of which may be configured similarly to physical marker 100) as well as autonomous vehicles 370, 372 which may be configured to communicate directly or indirectly with the physical markers as well as to operate in an autonomous mode in order to pick up and drop off passengers. Although only a few physical markers, vehicles and computing devices are depicted for simplicity, a typical system may include significantly more.

As shown in FIG. 3, each of computing devices 310, 320, 330, may include one or more processors, memory, data and instructions. Such processors, memories, data and instructions may be configured similarly to one or more processors 120, memory 130, data 132, and instructions 134 of computing device 110.

The network 360, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 310 may include one or more server computing devices having a plurality of computing devices, e.g., a load balanced server farm, that exchange information with different nodes of a network for the purpose of receiving, processing and transmitting the data to and from other computing devices. For instance, one or more computing devices 310 may include one or more server computing devices that are capable of communicating with computing device 110 of physical marker 100 or a similar computing device of physical markers 100A or 100B as well as computing devices 320, 330, and vehicles 370, 372 via the network 360. For example, vehicles 100, 100A, may be a part of a fleet of vehicles that can be dispatched by server computing devices to various locations. In this regard, the server computing devices 310 may function as a dispatching server computing system which can be used to dispatch vehicles such as vehicle 370 and vehicle 372 to different locations in order to pick up and drop off passengers. In addition, server computing devices 310 may use network 360 to transmit and present information to a user, such as user 322, 332 on a display, such as displays 324, 334 of computing devices 320, 330. In this regard, computing devices 320, 330 may be considered client computing devices.

As shown in FIG. 3, each client computing device 320, 330 may be a personal computing device intended for use by a user 322, 332, and have all of the components normally used in connection with a personal computing device including a one or more processors (e.g., a central processing unit (CPU)), memory (e.g., RAM and internal hard drives) storing data and instructions, a display such as displays 324, 334 (e.g., a monitor having a screen, a touch-screen, a projector, a television, or other device that is operable to display information), and user input devices 326, 336 (e.g., a mouse, keyboard, touchscreen or microphone). The client computing devices may also include a camera for recording video streams, speakers, a network interface device, and all of the components used for connecting these elements to one another.

Although the client computing devices 320 and 330 may each comprise a full-sized personal computing device, they may alternatively comprise mobile computing devices capable of wirelessly exchanging data with a server over a network such as the Internet. By way of example only, client computing device 320 may be a mobile phone or a device such as a wireless-enabled PDA, a tablet PC, a wearable computing device or system, or a netbook that is capable of obtaining information via the Internet or other networks. In another example, client computing device 330 may be a wearable computing system, shown as a wristwatch as shown in FIG. 3. As an example the user may input information using a small keyboard, a keypad, microphone, using visual signals with a camera, or a touch screen.

As noted above, each of vehicles 370, 372 may be configured to operate in a fully autonomous driving mode in order to transports goods and/or passengers to different locations. In this regard, the vehicles may include various computing devices, each of which may include processors, memory, data, and instructions. Such processors, memories, data and instructions may be configured similarly to one or more processors 120, memory 130, data 132, and instructions 134 of computing device 110. The vehicle's computing devices may control the direction and speed of the vehicle in the autonomous driving mode by controlling various components. By way of example, the vehicle's computing devices may navigate the vehicle to a destination location completely autonomously using data from map information and a route planning system which plans a route to a destination. The vehicle's devices may use also use a positioning system, which may include GPS or other positioning features (i.e. software and hardware) to determine the vehicle's location and a perception system including a plurality of sensors such as LIDAR, radar, sonar, cameras, etc. to detect and respond to objects when needed to reach the location safely. In order to do so, vehicle's computing devices may cause the vehicle to accelerate (e.g., by increasing fuel or other energy provided to the engine), decelerate (e.g., by decreasing the fuel supplied to the engine, changing gears, and/or by applying brakes), change direction (e.g., by turning the front or rear wheels of vehicle 100), and signal such changes (e.g., by lighting turn signals). Thus, the vehicle's computing devices may be able to control the functions of the vehicle's drivetrain (which may include various components between an engine of the vehicle and the wheels of the vehicle) in order to maneuver the vehicle in the autonomous driving mode.

As with memory 130, storage system 350 can be of any type of computerized storage capable of storing information accessible by the server computing devices 310, such as a hard-drive, memory card, ROM, RAM, DVD, CD-ROM, write-capable, and read-only memories. In addition, storage system 350 may include a distributed storage system where data is stored on a plurality of different storage devices which may be physically located at the same or different geographic locations. Storage system 350 may be connected to the computing devices via the network 360 as shown in FIGS. 3 and 4, and/or may be directly connected to or incorporated into any of the computing devices 110, 310, 320, 330, and/or vehicles 370, 372, etc.

Storage system 350 may store various information that the server computing devices 310 may access, update and use in order to function as dispatching server computing devices as discussed here. For instance, storage system may store information including the locations and statuses (assigned, occupied, unassigned, unoccupied, etc.) of the vehicles 370, 372 of a fleet of autonomous vehicles which may be reported periodically to the server computing devices 310 by the vehicles of the fleet. The storage system may also store information regarding the locations, as reported by the physical markers themselves, and statuses, including a list of assigned passengers and conditions around the markers (like the state of an adjacent parking or stopping area, local weather conditions, etc.), for a plurality of physical markers, such as physical marker 100, 100A, and 100B. In addition, the storage system may store information about the status of users who have requested rides, including ride histories, authentication information for the user's client computing devices, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

The physical marker 100 may be used to facilitate trip services for autonomous vehicles, such as vehicles 370, 372. For instance, a user (or passenger), such as user 322, may use his or her client computing device, such as client computing devices 320, to request a ride via an application. This request may include the current location of the client computing device and may be sent to a dispatching server computing device, such as server computing devices 310, via a network such as network 360.

In response to the request, the server computing devices 310 may select or identify a physical marker. This identified physical marker may be a closest physical marker to the current location of the client computing device 320 or another nearby physical marker depending upon the current demand for rides at all nearby physical markers. The server computing devices 310 may "assign" the user 322 (or the client computing device 320) to the identified physical marker and may then send a notification to the physical marker 100 via network 360. This selection may be based, for instance, on whether there is a sufficient number of vehicles in the vicinity of the selected marker to meet the demand assigned to that selected marker. This notification may indicate to the physical marker that a passenger is going to be taking a trip from the location of the physical marker and in some instances, may also include authentication information for the passenger's client computing device.

The server computing devices 310 may also send a notification to the passenger's client computing device, here computing device 320, instructing the user 322 to proceed to the location of the assigned physical marker, here physical marker 100 in order to begin the trip. This notification may also include information such as authentication information for authenticating with the physical marker as well as a map, walking direction, etc. identifying the location of the physical marker.

Figure 5:
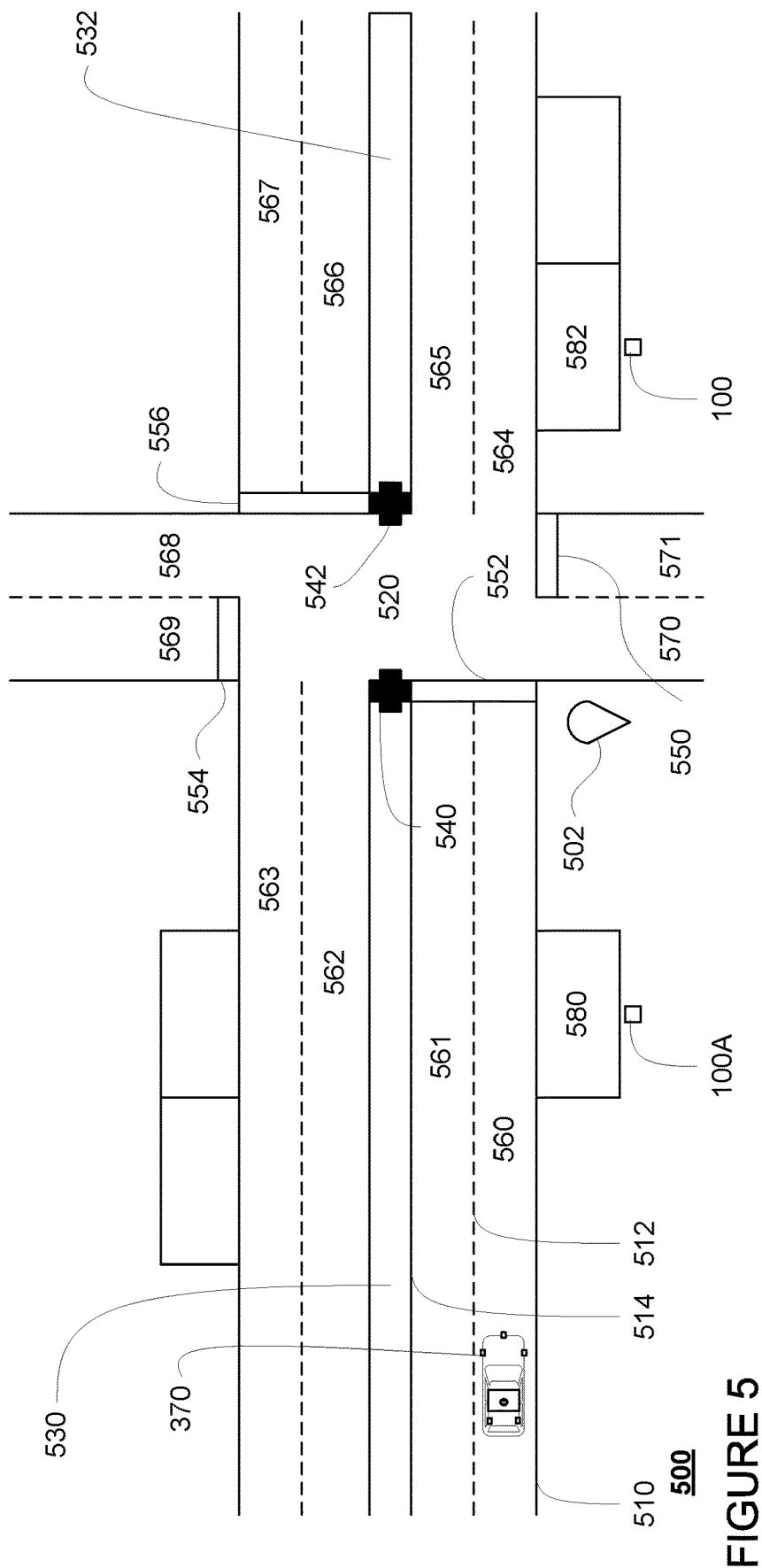
FIG. 5 is an example representation of a situation in accordance with aspects of the disclosure.
Figure 6:
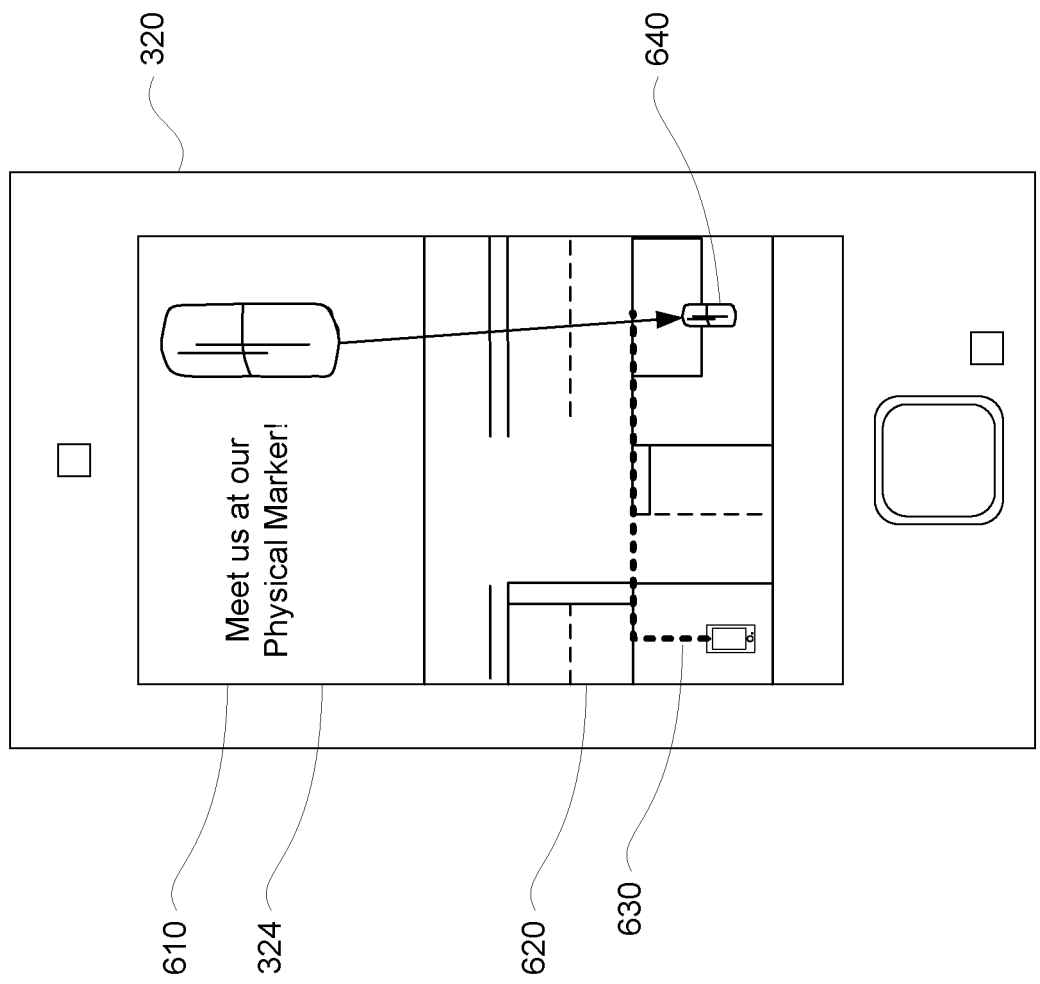
FIG. 6 is an example client computing device and screen shot in accordance with aspects of the disclosure.

The example of FIG. 5 depicts an example situation in which user 332 and his or her client computing device 320 at a first location 502 send a request to the server computing devices 310. For context, FIG. 5 includes an example section of roadway 500 including lane lines 510, 512, 514, intersection 520, median areas 530, 532, traffic signals 540, 542, stop lines 550, 552, 554, 556, lanes 560-567, and parking or stopping areas 580, 582. Proximate to the first location 502 of client computing device are physical markers 100 and 100A. In this example, the server computing devices 310 may send the location of the physical marker 100 to the client computing device 320 as well as a map and walking directions for display on display 324 in order to help the user 322 to reach the physical marker. FIG. 6 depicts client computing device 320 displaying a notification 610 including a map 620 and walking directions 630 to the location 640 of the physical marker 100.

Once the passenger (or rather, the passenger's client computing device) has reached the physical marker, the physical marker 100 may send a notification to the server computing devices 310 indicating the same. As one example, a passenger may be determined to have reached the physical marker when the client computing device 320 automatically attempts to authenticate itself to the physical marker via the application when the client computing device is within some predetermined distance, such as a few feet or more or less, of the location of the physical marker. Once authenticated, the aforementioned notification may automatically be sent.

As another example, the passenger may be required to "tap" touch or otherwise contact the physical marker with his or her client computing device in order for the notification to be sent. This may enable the physical marker and the phone to establish a connection, for instance via near field communication protocols. Similarly, the passenger may be required to provide biometric information, such as a fingerprint, to the user input 150. In such examples, the notification may also indicate that the passenger has contacted the physical marker with her is her client computing device and thus there is actual confirmation of the passenger's location at the physical marker.

Alternatively, in the event that a passenger does not have a client computing devices (e.g. no mobile phone) or does not want to use his or her client computing device, he or she may interact with the physical marker in other ways to request a vehicle at the physical marker. For instance, the passenger could use the user input 150 to request a vehicle, for instance by entering destination information, payment information, and in some examples, identification information. For instance, the potential passenger may provide biometric information, such as a finger print, by way of the user input 150, or by allowing the physical marker to capture a camera image of the potential passenger. This information as well as the aforementioned notification may also be sent to the server computing devices 310 in order indicate that the passenger has requested a ride at the physical marker. In some instances, this biometric information could be used to unlock and/or open a door of the vehicle. As another instance, the passenger may tap or hold near to the physical marker an RF-enabled security badge which identifies the passenger to the physical marker. This information may also be sent to the server computing devices 310 with the aforementioned notification.

In response to receiving the notification, the server computing devices 310 may assign a vehicle, such as vehicle 370 or 372, to the passenger. For instance, returning to FIG. 5, server computing devices 310 may identify vehicle 370 as a closet available, unassigned vehicle and assign vehicle 370 to the user 322. The server computing devices 310 may then provide a notification to the assigned vehicle via network 360 about the passenger's destination, authentication information for authenticating with the passenger's client computing device, the location of the physical marker 100 to which the passenger was assigned, as well as any other necessary information, such as the aforementioned biometric data that may be used to unlock and/or open doors of the vehicle. The assigned vehicle may then proceed to the location of the physical marker 100 in order to pick up the passenger.

In this way, the vehicle and the server computing devices 310 are able to confirm the physical location of the passenger with higher accuracy than GPS before and after a vehicle is dispatched as well as during the time that the assigned vehicle is traveling to reach the physical marker. In addition, by waiting to assign vehicles only to passengers who have reached a physical marker, the server computing devices 310 are effectively able to avoid situations in which a passenger assigned to a vehicle is delayed reaching the physical marker which would cause the vehicle to have to wait longer for the passenger. This can be especially troublesome when other passengers are waiting for vehicles.

As an alternative to assigning a vehicle to a passenger only after a passenger has reached a physical marker, the server computing devices 310 may initially assign a vehicle to a passenger in conjunction with assigning a physical marker. Once the passenger has reached the physical marker, the server computing devices 310 may assess the assignment of the vehicle to that passenger. As an example, if Passenger A requests a vehicle and thereafter Passenger B requests a vehicle, but Passenger B reaches the physical marker first, the vehicle assigned to Passenger A may be reassigned to passenger B. This then may reduce the amount of time that Passenger B has to wait for a vehicle and improve Passenger B's experience with the service. This too may add additional efficiency to the system by reducing the amount of time that a vehicle spends waiting for an assigned passenger. In some examples, the reassignment of vehicles may also be based on a determination that the vehicle assigned to Passenger A is capable of completing the trip requested by Passenger B (e.g., sufficient car capacity, charge, amenities and features).

In addition, the vehicle previously assigned to Passenger B may then be reassigned to Passenger A or another passenger, for instance, if there are other passengers who requested vehicles between Passenger A and Passenger B. Even more complex reassignments may be imagined where there are three or more passengers who request vehicles in a particular order in time and arrive in a different order. Of course, if there are no other passengers waiting for vehicles and a vehicle is approaching the marker and/or waiting for the vehicle's assigned passenger when the passenger has reached the physical marker, the server computing devices 310 need not reassign the passenger to a new vehicle.

This may be particularly helpful in locations where demand for ride services is consistently high or has a tendency to change significantly over very short period of time. In such locations, because traffic congestion is high or can become very high very quickly, it can be difficult to pull over and wait for passengers to load and unload. This may be particularly true for locations such as airports and concert venues. For example, passengers arriving on a flight may request a ride shortly after leaving the plane, not knowing how long it may take to collect their bags and make it to the pickup location. As described above, to avoid having a vehicle wait at an inconvenient, dangerous or inappropriate location, a vehicle may or may not be assigned to each passenger at the time of this request. Rather, the passenger may be assigned to a physical marker located near a loading zone or outside of a baggage claim area. Once the passenger reaches the physical marker, the passenger may then be assigned a vehicle.

In this manner, the system may be able to better forecast and balance demand for a busy pickup location. For example, the system received 5 requests for a vehicle to pick them up at the airport from 5 different passengers. In order to reduce wait times, the server computing devices 310 can send 5 vehicles to the pickup location over a period of time. However, the server computing devices delay making specific vehicle to passenger assignments until the passengers reach the physical marker, and may make the assignments in the order that each passenger reaches at the pickup location. Alternatively, a plurality of vehicles could also be located at a staging area close to the pickup location. The number of vehicles located at the staging area may be adjusted by the server computing devices 310 based upon the actual number of requests, an expected number of requests over some period in the future, etc. For instance, if there are 5 passengers requesting vehicles as in the example above and only 4 vehicles at the staging area, the server computing devices 310 may send an additional vehicle or vehicle to the staging area and/or directly to the physical marker in order to meet the current demand and/or future expected demand. In addition, vehicles may be sent to to the pickup location only when each passenger that has requested a ride actually reaches at the physical marker.

In another aspect, this can be done without a physical marker located at the pickup location. For instance, after the initial request for a ride, the server computing devices 310 can monitor the location of each passenger's device via various signals (such as GPS, WiFi, BlueTooth®, etc.) received form the passenger's device. In this example, the server computing devices may only assign and/or send a vehicle to the pickup location when the device's location indicates that the passenger is a certain threshold distance from a pickup location selected by the passenger and/or the server computing devices 310.

The physical marker 100 may also communicate information with an autonomous vehicle, such as vehicle 370 and/or 372, either directly or indirectly via the server computing devices 310 as well as with the server computing devices 310. For instance, the physical marker 100 may provide notifications via network 360 to a vehicle indicating the location of the vehicle's assigned passenger relative to the physical marker. As an example, the strength of signals from the passenger's client computing device can be used to determine his or her distance from the physical marker.

As another instance, the physical marker 100 may detect its location, for instance via GPS, WiFi, cellular or a combination of these, or movement, for instance via an accelerometer and/or gyroscope, and notify the dispatching server computing device if the physical marker has been moved. This may allow the physical marker to indicate changes in its location reducing the likelihood of theft or vandalism.

The physical marker 100 may also use its various sensors 158 to determine a number of pedestrians proximate to or approaching the physical marker, and provide this information to the dispatching server computing device. For instance, objects may be detected and identified as pedestrians or other types of objects using a LIDAR sensor of the various sensors 158. With this information, the dispatching server computing device may be better able to distribute the vehicles of the fleet to accommodate demand as well as adjust pricing in some circumstances.

The physical marker 100 may also use its various sensors 158 to detect the state of a parking or stopping area adjacent to the physical marker. For instance, FIG. 5 includes a parking or stopping area 582 for the physical marker 100 as well as a parking or stopping area 580 for the physical marker 100A. In this example, the physical marker may provide an assigned the vehicle with information regarding whether the adjacent parking or stopping area is occupied.

For instances when there are multiple vehicles and multiple passengers, the physical marker may arrange a "queue" of assigned vehicles without requiring the vehicles to "lineup" or at a location remote from the physical marker 100 in order to avoid having too many vehicles proximate to the parking or stopping area. The physical marker 100A or 100 may indicate to each vehicle via network 360 when it is that vehicle's "turn" to come to and stop in the parking or stopping area 580 or 582. For instance, the queue may be based on the earliest assigned vehicle and/or the assigned vehicle closest to the parking or stopping area. In some instances, the physical marker may provide the vehicle with raw or processed sensor data via network 360 in order to better allow the vehicle's computing devices to "see" the vehicle's environment as it approaches the physical marker from a distance.

Information generated by the physical marker 100 may also be used in other ways. For instance, if one physical marker detects a large number of pedestrians proximate to the physical marker, one or more passengers and assigned vehicles may be "reassigned" to another nearby physical marker or another transportation type (such as an autonomous bus, non-autonomous bus, etc.). For instance, user 322 (and/or client computing device 320) may be reassigned to physical marker 100A if there are too many nearby pedestrians and/or passengers assigned to physical marker 100. This may help to distribute demand for rides among multiple physical markers and thereby reduce waiting times.

This reassigning may be accomplished by the dispatching server computing devices or by the physical marker communicating with the other nearby physical marker. In some instances, a confirmation request may be provided to the passenger's client computing device to allow the passenger to decide whether he or she would prefer to wait longer at the current physical marker or move to the nearby physical marker. Again, walking or other instructions may be provided.

The physical marker 100 may also communicate with pedestrians. For instance, the physical marker may display visual and/or provide audible instructions on how to access the application (i.e. download), communicate with the physical marker to request a vehicle assignment (i.e. by tapping, scanning a QR code), pressing a button on the sign and/or entering a destination via a user input device or audibly (which may even obviate the need for a passenger's client computing device), etc.

When a client computing device which includes the aforementioned application is proximate to the physical marker 100, the physical marker may also attempt to communicate with the user of the client computing device. For instance, the physical marker 100 may send a notification via network 360 to the client computing device indicate that the physical marker is nearby to the user and is able to request a vehicle for the user. In some examples, the notification may even indicate a wait time in order to encourage the user to request a ride. The notification may also include information such as discounts for nearby restaurants or locations where the user could go based on his or her ride history from the application.

Once a passenger is assigned to a vehicle, the physical marker 100 may also provide notifications to indicate that the assigned vehicle is approaching or about to arrive, for instance by displaying or audibly indicating an estimated time of arrival for the assigned vehicle. These notifications may be made specific to specific passengers, for instance, by assigning such passengers a symbol or color to better preserve the passenger's privacy. The physical marker may also provide warnings to protect pedestrians from inadvertently walking into or near the parking or stopping area, for instance by displaying and/or providing audible notifications or information. As an example, the physical marker may sound a warning noise and/or flash in different colors to indicate that a vehicle is about to leave or about to approach. For instance, the display devices 152 may be lit in "red" to indicate that a vehicle is approaching, "orange" or "yellow" to indicate that a vehicle is leaving, and "green" to indicate that none of the vehicles associated with the sign is approaching or leaving the parking or stopping area. Similarly, for visually impaired persons, the physical marker may provide periodic chirping noises via speakers 154 to indicate its location to such persons.

The physical marker 100 may also be able to assist a vehicle with passenger drop offs. For instance, prior to arrival, a vehicle, such as vehicles 370 or 372, may attempt to communicate wirelessly with a physical marker. The physical marker 100 may indicate whether the physical marker's parking or stopping area is available via information from the physical marker's various sensors 158. As such, the physical marker 100 may indicate whether the vehicle should go to or attempt to communicate with a different physical marker. Again, the physical marker 100 may also provide the vehicle with raw or processed sensor data in order to better allow the computing devices of vehicles 370 or 372 to "see" the vehicle's environment as the vehicle approaches the physical marker from a distance. This may also allow the vehicle to communicate to a passenger available parking options and to allow the passenger choose which parking or stopping location (i.e. which physical marker) using a touch screen, audible instructions (inputted via a microphone), and/or physical gestures (such as swiping, etc.).

Once a passenger exits a vehicle, physical marker 100 may again be used to confirm his or her location. For instance, the passenger may tap his or her client computing device on the physical marker in order to confirm that he or she has arrived at the location of the physical marker 100. In some instances, the application may allow the passenger to opt for a confirmation image of the passenger at the physical marker. For example, once the passenger taps or exits the vehicle, a camera of the physical marker may capture an image of the passenger and send this image to a location designated via the application, such as via text, mms, email, etc. In this way a minor, elderly, or handicapped passenger may be able to automatically inform a parent, guardian or caretaker that the passenger has arrived at the location.

Figure 7:
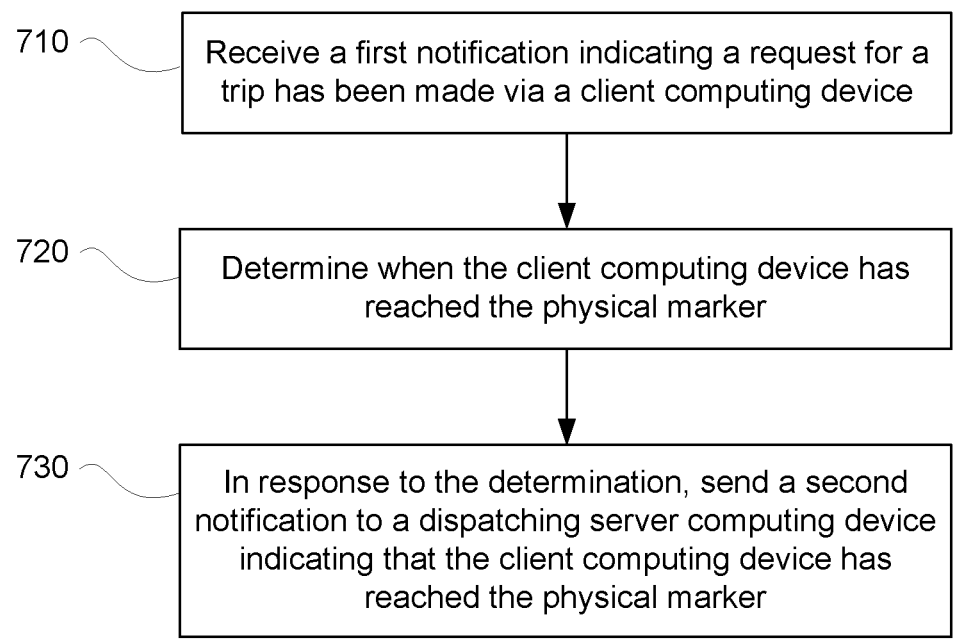
FIG. 7 is an example flow diagram in accordance with aspects of the disclosure.

FIG. 7 includes an example flow diagram 700 of some of the examples for facilitating passenger trips for autonomous vehicles discussed above. The steps of this flow diagram 700 may be performed by one or more processors such as processors of computing devices 110 of the physical marker 100, 100A or 100B, each of which are remote from the autonomous vehicles. At block 710, a first notification indicating a request for a trip has been made via a client computing device is received. When the client computing device has reached the physical marker is determined at block 720, and at block 730, in response to the determination, a second notification is sent to a dispatching server computing device indicating that the client computing device has reached the physical marker.

Figure 8:
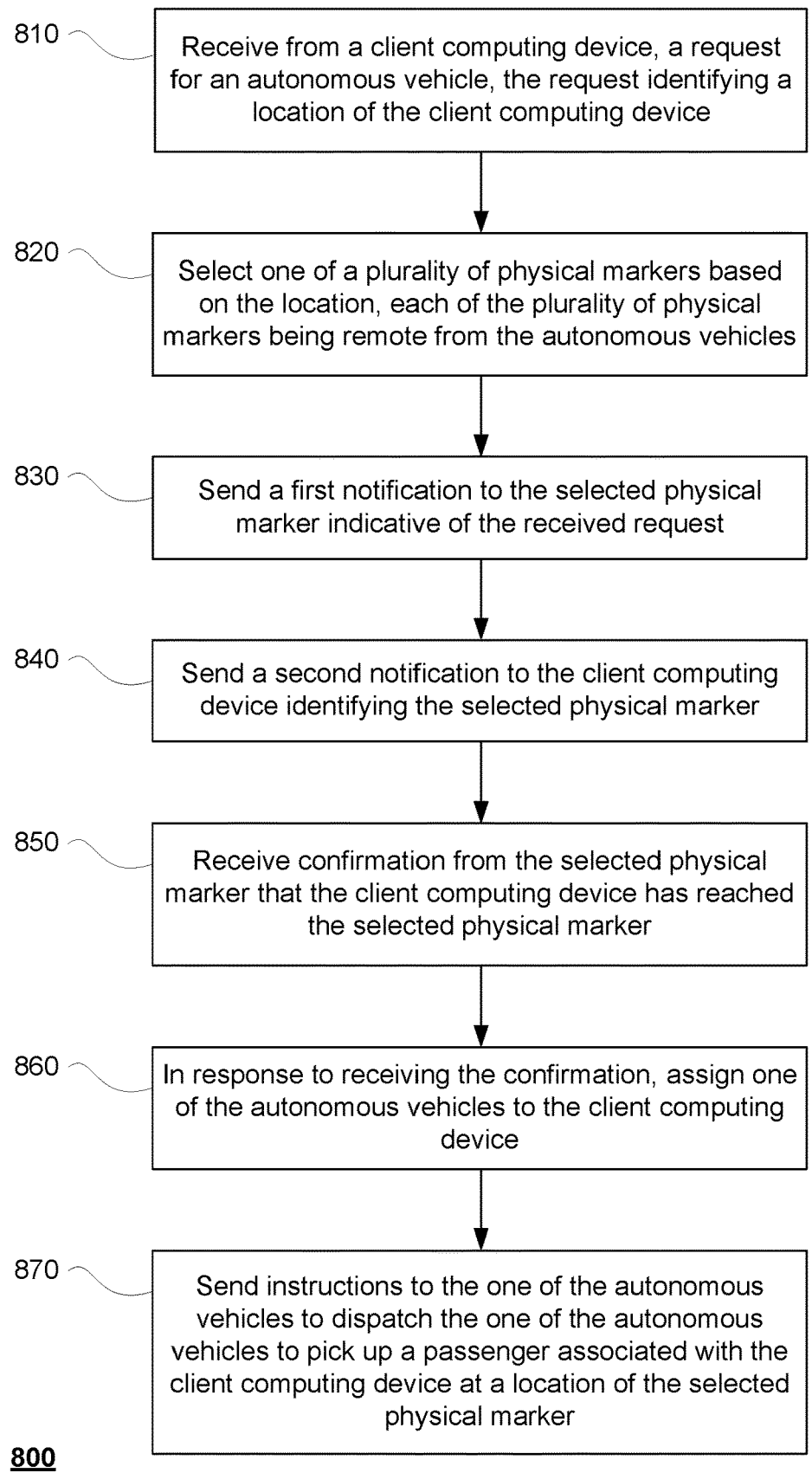
FIG. 8 is another example flow diagram in accordance with aspects of the disclosure.

FIG. 8 includes an example flow diagram 800 of some of the examples for assigning autonomous vehicles for passenger trips, which may be performed by one or more processors such as processors of server computing devices 310. At block 810, a request for an autonomous vehicle is received. The request identifies a location of the client computing device. At block 820, one of a plurality of physical markers is selected based on the location and other conditions. Each of the plurality of physical markers is remote from the autonomous vehicles. At block 830, a first notification is sent to the selected physical marker indicative of the received request. At block 840, a second notification is sent to the client computing device identifying the selected physical marker. At block 850, confirmation from the selected physical marker that the client computing device has reached the selected physical marker is received. At block 860, in response to receiving the confirmation, one of the autonomous vehicles is assigned to the client computing device. At block 870, instructions are sent to the one of the autonomous vehicles to dispatch the one of the autonomous vehicles to pick up a passenger associated with the client computing device at a location of the selected physical marker.

The features described herein may allow for better passenger experience in terms of passenger pickups and drop offs, and especially in areas with high demand. The physical marker provides a clear way for a passenger to understand where to wait for a vehicle while at the same time providing the ride system (the dispatching server computing devices as well as assigned vehicles) with confirmation of the passenger's location as well as information about the physical marker's environment. At the same time, the physical marker is able to better facilitate pickups and provide information to passengers while they are waiting. This, in turn, may allow passengers to feel safer and more assured. Other potential benefits may include reduced waiting times for vehicles, more efficient loading/unloading and better vehicle and vehicle space utilization (i.e. there may be less vehicles parked and waiting for someone that is not there yet).

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of facilitating passenger trips for autonomous vehicles, the method comprising:
   receiving, by one or more processors of a physical marker remote from the autonomous vehicles, a first notification indicating a request for a trip has been made via a client computing device;
   determining, by the one or more processors, when the client computing device has reached the physical marker; and
   in response to the determination, sending, by the one or more processors, a second notification to a dispatching server computing device indicating that the client computing device has reached the physical marker.

2. The method of claim 1, wherein determining when the client computing device has reached the physical marker includes determining that the client computing device has physically contacted the physical marker.

3. The method of claim 1, wherein determining when the client computing device has reached the physical marker includes determining that the client computing device is within a predetermined distance of the physical marker.

4. The method of claim 1, wherein the first notification includes information for authenticating the client computing device, and wherein determining when the client computing device has reached the physical marker includes authenticating the client computing device using the information and the second notification is sent after the authenticating.

5. The method of claim 1, further comprising, sending one or more notifications to an assigned vehicle for the passenger, the one or more notifications indicating a location of the passenger relative to the physical marker.

6. The method of claim 4, further comprising, determining the location of the passenger relative to the physical marker via signals from the client computing device.

7. The method of claim 1, further comprising:
   determining a number of pedestrians proximate to the physical marker using one or more sensors; and
   sending the number of pedestrians to the dispatching server computing device.

8. The method of claim 1, further comprising sending data generated by one or more sensors of the physical marker to an autonomous vehicle assigned to a user of the client computing device.

9. The method of claim 1, further comprising:
   monitoring, using sensors of the physical marker, status of a stopping area adjacent to the physical marker; and
   sending the status to an autonomous vehicle assigned to a user of the client computing device.

10. The method of claim 9, wherein the status indicates that the stopping area is available for the autonomous vehicle.

11. The method of claim 1, further comprising:
   determining a status of a stopping area adjacent to the physical marker; and
   providing one or both of a visual or an audible notification at the physical marker indicating the status.

12. The method of claim 11, wherein the status includes an autonomous vehicle approaching the stopping area.

13. The method of claim 1, further comprising:
   receiving information indicating a location of an autonomous vehicle assigned to a user of the client computing device; and
   providing one or both of a visual or an audible notification at the physical marker indicating a status of the autonomous vehicle based on the received information.

14. The method of claim 1, further comprising:
   determining that a passenger should wait at a second physical marker; and
   sending a notification to the client computing device based on the determination that a passenger is able to wait at a second physical marker.

15. The method of claim 14, wherein the notification includes a request for confirmation that the passenger wishes to go to the second physical marker.

16. The method of claim 15, wherein the notification includes walking instructions for reaching the second physical marker from the physical marker.

17. A method of assigning autonomous vehicles for passenger trips, the method comprising:
   receiving, by one or more processors of one or more server computing devices, from a client computing device, a request for an autonomous vehicle, the request identifying a location of the client computing device;
   selecting, by the one or more processors, one of a plurality of physical markers based on the location, each of the plurality of physical markers being remote from the autonomous vehicles;
   sending, by the one or more processors, a first notification to the selected physical marker indicative of the received request;
   sending, by the one or more processors, a second notification to the client computing device identifying the selected physical marker;
   receiving, by the one or more processors, confirmation from the selected physical marker that the client computing device has reached the selected physical marker;
   in response to receiving the confirmation, assigning, by the one or more processors, one of the autonomous vehicles to the client computing device; and
   sending, by the one or more processors, instructions to the one of the autonomous vehicles to dispatch the one of the autonomous vehicles to pick up a passenger associated with the client computing device at a location of the selected physical marker.

18. The method of claim 17, wherein the second notification includes instructions for a passenger to proceed to the location of the selected physical marker.

19. The method of claim 17, further comprising:
receiving from the selected physical marker, information indicating a number of pedestrians within a predetermined distance of the selected physical marker; and
using the information indicating the number of pedestrians to distribute one or more of the autonomous vehicles.

20. The method of claim 17, wherein the confirmation indicates that the client computing devices has authenticated itself to the physical marker.

\* \* \* \* \*